United States Patent [19]

Baudet et al.

[11] 4,235,709

[45] Nov. 25, 1980

[54] SELECTIVE FLOCCULATION PROCESS FOR TREATING FINES OF PHOSPHATE ORES

[75] Inventors: Gérard Baudet; Michel Morio, both of Orleans; Christian Vautrelle, Clery-St-Andre, all of France

[73] Assignee: Bureau de Recherches Geologiques et Minieres, Paris, France

[21] Appl. No.: 930,227

[22] Filed: Aug. 2, 1978

[30] Foreign Application Priority Data

Aug. 5, 1977 [FR] France ................................. 77 24301

[51] Int. Cl.$^3$ ............................................. B03B 1/04
[52] U.S. Cl. ............................................ 209/5; 209/49
[58] Field of Search ............................. 209/5, 160, 49

[56] References Cited

U.S. PATENT DOCUMENTS

| | | | |
|---|---|---|---|
| 2,381,514 | 8/1945 | Phelps | 209/5 |
| 2,660,303 | 11/1953 | Haseman | 209/5 |
| 3,314,537 | 4/1967 | Greene | 209/5 |
| 3,321,649 | 5/1967 | DeBenedictis | 209/5 X |
| 3,509,021 | 4/1970 | Woodward | 209/5 X |
| 3,661,259 | 5/1972 | Sivianni | 209/5 |
| 3,670,883 | 6/1972 | Weir | 209/5 |
| 3,701,417 | 10/1972 | Mercade | 209/5 |
| 3,837,482 | 9/1974 | Sheridan | 209/5 |
| 3,915,391 | 10/1975 | Mercade | 209/166 |

*Primary Examiner*—Robert Halper

*Attorney, Agent, or Firm*—Hammond & Littell, Weissenberger and Muserlian

[57] ABSTRACT

A selective flocculation process is provided for the treatment of phosphate ores formed essentially of apatite and a mixture of silicate minerals, for the separation and valorization, i.e., recovery, of the fines, particularly of the fractions whose particle size is less than about 40 μm. The process comprises the following sequence of three steps:
 (a) a first step of conditioning the ore by contacting the particles of the ore pulp with a conditioning agent such as sodium silicate;
 (b) a second step of flocculation with the selective formation of apatite agglomerates, by diluting the pulp resulting from the first step with water and by adding thereto a flocculation agent constituted by a water-soluble anionic polymer capable of being fixed only on the apatite particles, said flocculation agent being essentially selected from among cellulose derivatives, starches and polysaccharides generally, comprising carboxyl groups;
 (c) a third step of separation by sedimentation and precipitation operations of the dispersed minerals and of the flocculated material, which is constituted essentially of apatite, the latter then being recovered directly, the separation being effected on said flocculated material only to a cut-off dimension of about 40 μm.

25 Claims, No Drawings

SELECTIVE FLOCCULATION PROCESS FOR TREATING FINES OF PHOSPHATE ORES

BACKGROUND OF THE INVENTION

1. Field of the Invention

The present invention relates to the treatment of phosphate ores. More particularly it relates to a selective flocculation process for the treatment of fractions of fine granulometry of phosphate ores with a siliceous-clayey gang.

2. Description of the Prior Art

The treatment of ores generally implies flotation operations, which permit the separation of various minerals present in the crude ore. It is known, for example, the phosphate ores contain apatite mixed with other minerals derived from the gang, for example a siliceous and clayey gangue or a carbonated gangue. Such flotation treatments are widely used in practice for the treatment of course fractions; on the other hand, fine fractions which cannot be treated by flotation could be enriched by selective flocculation. To establish the state of the prior art in this field, one may mention, for example, the article of G. Baudet, M. Morio, M. Rinaudo and H. Nematollahi published in April 1977 in the Revue Industrie Minerale-Mineralurgie, under the title "Synthesis and Characterization of Selective Flocculents based on Xanthated Derivatives of Cellulose and Amylose." This document describes the principal selective flocculation processes.

In the case of phosphate ores, it is well-known that the fine mineral particles contained in the ores present a difficult problem, for it is not known how to separate them by flotation. As a general rule, ore particles having a granulometry higher than 40 $\mu$m, for example between 40 and 800 $\mu$m are quite suitable for a flotation treatment. Thus, at the present time, a prior separation of the fine fractions of granulometry less than about 40 $\mu$m is used, considering that it is not known how to treat them subsequently. In fact, if they were present in the mineral fractions, they would constitute an intolerable handicap for the subsequent processing operations. It follows that these fine fractions are at present discarded and lost, which represents very considerable losses since they can reach close to 40% of the phosphate contained in the extracted ore. At the present time, it is accepted that, with respect to the extracted ore, there is a recovery of only 35 to 70% of the phosphate content, which is a Figure which becomes more and more unacceptable.

It has already been proposed in the prior art to utilize processes to exploit the fines of phosphate ores more completely. One of these representative documents is U.S. Pat. No. 2,660,303 granted in the name of J. F. Haseman, which relates to the flocculation of the colloidal fines in a phosphate ore in the presence of clay. This known process consists firstly of dispersing the particles of ore by means of an agent which is preferably sodium hydroxide.

Other known dispersing agents may be utilized and among them sodium silicate. The essential step of the process consists of flocculating the aqueous suspension of phosphate using a starch as a flocculating agent. However, in the course of the tests from which the present invention has been developed, it was observed that the use of simple starch for flocculating the apatite selectively in phosphate ores with a clayey and siliceous gang did not permit a satisfactory selectivity to be achieved nor a sufficiently high flocculation yield.

The invention relates to a process which enables the above-mentioned drawbacks of the prior art to be overcome.

More particularly it relates to a selective flocculation process for apatite of fine granularity contained in phosphate ores.

It is therefore a principal object of the invention to provide a process which can profit from the ore fractions whose granulometry is less than 40 $\mu$m on the average.

It is also an object of the invention to provide a process which may be applied on the industrial scale and which is directly applicable to the treatment of phosphate ores as extracted at the present time.

GENERAL DESCRIPTION OF THE INVENTION

In its most general form, the invention relates to a process for the treatment of phosphate ores formed essentially of apatite and a siliceous and clayey gang, for the separation and valorization of the fines, in particular of the fraction whose granulometry is less than about 40 $\mu$m, said process being characterized by the succession of the three following steps:

(a) a first conditioning step for the ore by contacting the particles of the ore pulp with a conditioning agent constituted preferably by sodium silicate, (b) a second flocculation step with the formation of selective apatite agglomerates, by diluting the pulp resulting from the first step with water and by adding thereto a flocculation agent constituted by a water-soluble anionic polymer capable of being fixed only on the apatite particles, said flocculation agent being essentially selected from among cellulose derivatives, starches and polysaccharides generally, comprising carboxyl groups, and (c) a third separation step by operations known in themselves, of sedimentation and decantation of the dispersed minerals and of the flocculated material, which is constituted essentially of apatite, the latter being then directly recovered, the separation being carried out on said flocculation material only to a cut-off size of about 30 to 40 $\mu$m.

According to an essential feature of the invention, the process permits the separation directly of the fine fractions of apatite which, at the present time, are discarded and lost. In certain known processes, the mixtures of mineral particles are treated by suspending them in water to form a dispersion to which are added selective agents which cause agglomeration of certain determined particles. The latter have then a tendency to agglomerate and can be separated by decantation. It is thus known, in the first step, to disperse the aggregates of the silicate minerals of gang and apatite.

The process according to the invention involves first a conditioning and applies this known technique in the first step (a). In the course of this step, the particles of the ore pulp are contacted with a reactant serving as a deflocculent and conditioning agent. Among the reactants which are suitable, may be mentioned those which are described in the bibliographical references appended to the article of the Revue Industrie Minerale Mineralurgie of Apr. 1977 cited above. Additionally may also be mentioned the patents indicated among the bibliographical references of this article and, of course, the teachings of these various documents are introduced into the present description by way of reference for the technician skilled in the art.

Among the conventional reactants, may be mentioned alkali polyphosphates such as sodium hexametaphosphate, sodium tripolyphosphate, sodium pyrophosphate, as well as alkaline agents such as sodium hydroxide or sodium carbonate and other agents of the same type. For phosphate ores with a siliceous and clayey gang, it is also possible to use polymers of acrylic acid having a molecular weight less than about 15,000.

It has however been observed, in accordance with the present invention, that the known reactants cited above are not perfectly suitable in the treatment provided according to the invention, since they offer a selectivity capable of improvement. According to the invention, it has been found that the reactant used as a conditioning agent in the first step of the process had preferably to be essentially constituted by sodium silicate. More advantageously, a sodium silicate is used having a ratio $SiO_2/Na_2O$ of about 3.5. Such an agent is used in the form of a solution in water, which then has a density close to 1.33. The reactive dose to be used is of the order of 7.5 to 15 kg per ton of ore. The duration of conditioning is of the order of 30 seconds to 3 minutes.

The fraction of the treated ore comprises the grinding fines and the ore fines, which represents the fractions of the granularity comprised between 0 and about 40 $\mu$m. In the course of the first step, it is advantageous to accentuate the effect of the conditioning agent, which acts as an electrolyte, by a mechanical stirring capable of well individualizing the particles to be separated. Hence there is used in the first step a rapid agitation with the effect of mechanical dispersion. This step is naturally applied in an aqueous phase and the concentration of solid matter of the latter will be of the order of 150 to 250 g per liter.

pH conditions are applied permitting the state of dispersion of the particles to be facilitated. For example, with phosphate ores with a siliceous gang, pHs are used comprised between 6 and 10, preferably in the vicinity of 9. As necessary, the pH must therefore be adjusted to these basic values by adding a complement of a basic agent such as sodium hydroxide.

On emerging from the first step, one hence obtains a mineral pulp in which the particles of apatite and of other minerals are well individualized. In the second step of the process, selective flocculation of the apatite particles is carried out. For the application of this step, the first operation consists of diluting with water the pulp derived from the first step to bring the latter to a concentration of solids of the order of 50 to 100 g per liter. The pH of the pulp must always be situated between 6 and 10, and preferably in the vicinity of 9, which involves a possible adjustment by the addition of sodium hydroxide.

To the pulp thus diluted, is added a polyelectrolyte capable of selectively forming apatite agglomerates. It is an organic polymer of high molecular weight soluble in water, which is fixed only on the apatite. Such an agent is capable of bridging several phosphate particles in order to ensure the cross-linking, which enables flocks to be obtained of a minimal dimension of about 25 $\mu$m and capable of ranging up to 500 $\mu$m.

According to a critical feature of the invention, the flocculation agent must be selected from among the derivatives of cellulose, of starches and polysaccharides generally, comprising carboxyl groups. The presence of these groups is essential for the obtaining of good results of flocculation and selective separation. Advantageously there are used celluloses or modified starches, for example carboxymethyl cellulose or carboxymethyl starch. The dose of flocculation agent to be added is of the order of 0.1 to 8 kg per ton of pulp, the calculation being with respect to the content of dry matter of the latter. Advantageously a carboxymethyl cellulose or a carboxymethyl starch is used having an average degree of substitution of about 0.40 and the dose to be added would be from 0.1 to 5 kg per ton, according to the degree of polymerisation of the flocculent molecule.

In the course of the second step, "moderate" conditions of agitation must be applied and operation must be on a diluted pulp as has been mentioned above. The treatment times are of the order of one minute.

The second step of the process of the invention provides products of flocculated apatite which can then be separated from the clay and from the silica, by operations known in themselves of decantation and sedimentation. It is very advantageous that the invention can enable the obtaining directly of a flocculated material constituted practically and exclusively of apatite. In fact, the flocculation only involves a mineral which can be separated to a cut-off granulometry dimension which is relatively coarse. According to the invention, the separation is characterized by its cut-off dimension which will be comprised preferably between 30 and 100 $\mu$m, for example equal to about 40 $\mu$m.

In practice, it is possible to operate in two successive operations of decantation-sedimentation. In the course of the first operation, it is worked with an initial concentration of the order of 50 g per liter. By decantation, the particles of granularity higher than 40 $\mu$m are separated from those of granularity less than 40 $\mu$m. The phosphate concentrate is recovered and the fine fraction constituted by the sterile ores is discarded. The product emerging from the first decantation is rewashed and diluted to a concentration of the order of 25 g per liter. A second operation of sedimentation is then carried out which provides the final concentrate.

The technician skilled in the art will understand that the process of the invention hence enables the obtaining directly of fractions of apatite which at the present time, were discarded. In addition, the process of the invention is directly applicable on the industrial scale by reason of the possibilities that it offers at the level of the cut-off size of the apatite fractions to be separated in the third step.

The process of the invention is applicable to the treatment of fine fractions of phosphate ores with a siliceous gang of any origin.

DESCRIPTION OF PREFERRED EMBODIMENTS

The process of the invention will be illustrated, without any limitation being intended, by the following Examples which relates to the treatment of a phosphate ore with a siliceous and clayey gang. cl EXAMPLE 1

The fine fraction, discarded by an enrichment factory, of a phosphate ore with a siliceous and clayey gang was treated according to the process of the invention, the phosphate contained in this waste representing 45% of the phosphate contained in the all-inclusive ore. This fraction had the following chemical composition by weight:

$P_2O_5$: 23.6%; $SiO_2$: 17.6%, $Fe_2O_3$: 3.85%
$Al_2O_3$: 6.09%; MgO: 0.98%,
and for its granulometric composition:

more than 40 μm: 3.2%
more than 20 μm: 14.7%
more than 10 μm: 27.1%
more than 5 μm: 39.9%
more than 2 μm: 55.1%
more than 0.46 μm : 77.4%
more than 0.29 μm : 85.5%.

It was obtained in suspension in water containing 230 g of solids per liter. The treatment including the following principal operations:

(a) conditioning of the suspension at pH 9, adjusted by the addition of soda, with a sodium silicate solution of density 1.33 and of molar ratio $SiO_2/Na_2O = 3.5$, proportioned to 10 kg per ton of dry solids, in a fast rotary disperser, for 30 seconds.

(b) dilution of the suspension by the addition of water to obtain the concentration of solid of 50 g/l. The pH was kept at 9 by the addition of soda.

(c) conditioning of the diluted suspension with a carboxymethyl starch having a degree of substitution of 0.06 proportioned to 3 kg/t, in a slow shaker for about 1 minute. It was observed, at the end of this conditioning period, that there was a partial formation of agglomerates in the midst of the pulp.

(d) separation of the agglomerates of particles of dimension greater than 32 μm from with the fine dispersed particles, by decantation.

(e) dilution of the agglomerates obtained by the addition of water at pH 9 to form a suspension with 25 g of solid per liter.

(f) separation of the agglomerates of dimension greater than 32 μm by decantation of the preceding suspension. In the course of this operation, the dispersed fine particles which had been entrained in the primary flocculated phase had been partly removed.

The agglomerated particles forming the flocculated phase represented 36.6% by weight of the solid and the fine particles forming the dispersed phase, 63.4% by weight; their respective chemical compositions were as follows:

flocculated phase: $P_2O_5$: 32.35%—$SiO_2$: 6.75%—$Fe_2O_3$: 2.09%—$Al_2O_3$: 2.20%— MgO: 0.29%

-dispersed phase: $P_2O_5$: 18.60%—$SiO_2$: 24.53%—$Fe_2O_3$: 4.83%—$Al_2O_3$: 8.18%—MgO: 1.38%.

It was observed that the flocculated phase was enriched in phosphate whilst the dispersed phase was enriched in siliceous and clayey sterile materials, 50% of the phosphate being recovered in the form of a concentrate in the flocculated phase.

By applying the same process with different dosages of deflocculating and flocculating reactants, it is possible from this same fine waste, to obtain concentrates (flocculated phases) having more or less elevated $P_2O_5$ concentrations, the ratio of recovery of the phosphate varying reversely with these contents.

EXAMPLE 2

Using the same silicate as above, but in the ratio of 7.5 kg per ton of dry starting solid and 2 kg per ton of the same carboxymethyl starch, there was obtained a concentrate titrating 33.05% $P_2O_5$ for a recovery of 46.8% phosphate.

EXAMPLE 3

Operating as in Example 1 and again using 10 kg of the same silicate per ton of dry solid to be treated and 4.5 kg per ton of carboxymethyl starch having a degree of substitution of 0.40, there was obtained a concentrate titrating 30.75% $P_2O_5$ for a recovery of phosphate of 70%.

EXAMPLE 4

With a dose of 12.5 kg per ton of silicate and 5 kg per ton of carboxymethyl starch as defined in Example 3, there was obtained a concentrate titrating 31.55 $P_2O_5$ for a phosphate recovery of 64.8%.

EXAMPLE 5

This Example relates to a demonstration of the selective nature of the action of the flocculating agent used according to the invention for the extraction of apatite.

To this end, an ore identical with that of Example 1 was processed, subjecting it in known manner to granulometric separations involving no flocculating agent. Table 1 below assembles the contents of $P_2O_5$, $SiO_2$, $Fe_2O_3$ and $Al_2O_3$ of each of the granulometric fractions and the granulometric distributions of these oxides, in a sample of the fine fraction—40 μm of the treated ore:

TABLE I

| | Yield weight % | $P_2O_5$ content % | $P_2O_5$ distrib. % | $SiO_2$ content % | $SiO_2$ distrib. % | $Fe_2O_3 + Al_2O_3$ content % | $Fe_2O_3 + Al_2O_3$ distrib. % |
|---|---|---|---|---|---|---|---|
| More than 31.5 μm | 6.89 | 27.69 | 8.10 | 14.32 | 5.49 | 5.56 | 3.80 |
| More than 20 μm | 14.66 | 28.89 | 17.97 | 12.77 | 10.42 | 5.65 | 8.16 |
| More than 8 μm | 31.28 | 29.32 | 38.92 | 12.50 | 21.76 | 6.08 | 18.84 |
| More than 4 μm | 46.53 | 28.23 | 55.74 | 13.50 | 34.95 | 6.71 | 30.92 |
| More than 2 μm | 55.10 | 27.91 | 65.25 | 13.45 | 41.26 | 6.87 | 37.46 |
| More than 0.7 μm | 72.43 | 26.16 | 80.39 | 15.51 | 62.52 | 8.00 | 57.37 |
| More than 0 μm | 100.00 | 23.57 | 100.00 | 17.97 | 100.00 | 10.10 | 100.00 |

If the above data are compared with the results obtained in Example 1 relating to an application of the process of the invention, it is observed that the contents of $P_2O_5$ of the course fractions separated by elutriation or centrifugation, are systematically lower, the contents of $SiO_2$ and $Fe_2O_3 + Al_2O_3$ are systematically higher than the corresponding contents obtained in the phosphate concentrates separated by selective flocculation according to the invention. These comparisons in contents demonstrate the selectivity of fluocculation with respect to apatite. To obtain by simple granulometric classification, a recovery of $P_2O_5$ comparable with that obtained in Example 1, that is to say 50%, it would be necessary to use a cut-off size of about 5 μm. The fraction +5 μm would titrate at about 28.7% $P_2O_5$, about 13% $SiO_2$ and about 6.4% of $Fe_2O_3 + Al_2O_3$. In Example 1, the cut-off size was 32 μm.

The phosphate concentrate separated by simple elutriation at 5 μm would be of distinctly lower quality than that of a concentrate separated by selective flocculation, by means of carboxymethyl starch, for a cut-off size of 32 μm.

EXAMPLE 6

This example relates to the demonstration of the role of the dispersant used in the first conditioning step and its influence on the concentration of the phosphate.

In Example 1 the sodium silicate was replaced by 1 kg/t of sodium pyrophosphate. After selective flocculation by means of 4.5 kg/t of carboxymethyl starch having a degree of substitution 0.06, a concentrate was obtained having the following characteristics: $P_2O_5$ content: 29.75%, yield by weight: 41.23%, $P_2O_5$ recovery: 51.96%. This concentrate is found to be of lower quality than that of concentrate separated after conditioning by sodium silicate.

EXAMPLE 7

This example is given by way of comparison, in order to demonstrate the selectivity of flocculation for apatite, that is obtained due to the presence of the carboxyl groups on the carboxymethyl starches (C.M.A.).

Tests were carried out by means of an unsubstituted "12014" pregelatinized corn starch (comparison) and other trials according to the invention with C.M.A. "XK 55 C" and "12505" having respective degrees of substitution (DS) of 0.06 and 0.40. These flocculating agents were obtained from the "Societe des Produits du Mais," the European subsidiary of "Corn Products Co." (USA). In order that the comparison may be significant, unsubstituted starch was selected ("12014") having a degree of polymerization close to C.M.A.

The phosphate slurries had the following average chemical composition and granularity:

$P_2O_5$: 26.10%—$Fe_2O_3$: 2.76%—$Al_2O_3$: 5.77%—$SiO_2$: 17.05%.
 more than 40 μm: 0.7%
 more than 20 μm: 9.2%
 more than 10 μm: 17.5%
 more than 5 μm: 32.8%
 more than 2 μm: 51.9%
 more than 1 μm: 69.2%

The same conditions were used as in Example 1.

The phosphate concentrates separated by selected flocculation had the compositions indicated in Table II below.

TABLE II

| | Starch | | Phosphate Concentrate | | | | | |
|---|---|---|---|---|---|---|---|---|
| Sodium silicate kg/t | Nature | Proportion kg/t | Yield Weight % | $P_2O_5$ Cont. % | $P_2O_5$ Recov. % | Cont. $SiO_2$ % | Cont. $Fe_2O_3$ % | Cont. $Al_2O_3$ % |
| 15 | Non-modified | 10 | 26.34 | 28.60 | 28.63 | 14.55 | 2.40 | 4.48 |
| 15 | CMA-DS = 0.05 | 3 | 32.99 | 31.60 | 39.83 | 10.70 | 2.00 | 3.02 |
| 15 | CMA-DS = 0.40 | 3 | 46.52 | 32.95 | 58.90 | 9.45 | 1.97 | 2.26 |

The above results, demonstrate the improvement obtained by the use of C.M.A. having selective carboxyl groups for apatite.

In addition the flocks formed by means of C.M.A. have a larger size; the separation of the flocculated phase with the dispersed phase can be carried out for a cut-off size expressed in equivalent spherical diameter of 30 to 100 μm, instead of 10 μm.

It is seen that the C.M.A.s are valuable flocculating agents for flocculating apatite selectively in phosphate ores with a clayey and siliceous gang.

EXAMPLES 8 to 11

A sample of phosphate slurry of following chemical and granulometric composition:

$P_2O_5$: 25.06%—$Fe_2O_3$: 2.87%—$Al_2O_3$: 6.37% $SiO_2$: 17.45%
 more than 40 μm: 0.5%
 more than 20 μm: 9%
 more than 10 μm: 23%
 more than 5 μm: 35%
 more than 2 μm: 51%
 more than 1 μm: 63% has been treated successively according to the invention with sodium silicate and a non purified industrial carboxymethyl cellulose having a degree of substitution DS=0.7 and a high viscosity (product sold under the name CMC T 160 by Hercules France). The results of selective flocculation of phosphate are given in Table III below:

TABLE III

| EXAMPLE | Sodium silicate kg/t | Flocculating agent CMC T 160 (g/t) | Phosphate concentrate | | | | |
|---|---|---|---|---|---|---|---|
| | | | Yield weight % | $P_2O_5$ Cont. % | $P_2O_5$ Recov % | Cont. $Fe_2O_3$ | Cont. $Al_2O_3$ |
| 8 | 17.5 | 50 | 25.6 | 32.65 | 33.35 | 1.28 | 2.03 |
| 9 | 22.5 | 150 | 29.5 | 31.90 | 37.55 | 1.42 | 2.50 |
| 10 | 17.5 | 150 | 41.3 | 30.80 | 50.63 | 1.69 | 2.60 |
| 11 | 20 | 100 | 31.5 | 31.9 | 39.87 | 1.43 | 2.52 |

We claim:

1. Selective flocculation process for the recovery treatment of phosphate ore fractions having fine granulometry, said fractions being formed essentially of apatite and a mixture of silicate materials, particularly of the fractions whose particle size is less than about 40 μm, said process comprising the following sequence of three steps:
    (a) a first step of conditioning said fractions by contacting the particles of the ore pulp with a conditioning agent to form a dispersion;
    (b) a second step of flocculation with the selective formation of apatite agglomerates, by diluting the pulp resulting from the first step with water and by adding thereto a flocculation agent constituted by a watersoluble anionic polymer capable of being fixed only on the apatite particles, said flocculation agent being selected from the group consisting of derivatives of cellulose, starches, and polysaccharides containing carboxyl groups; and (c) a third step of separation by sedimentation and precipitation operations of the dispersed minerals and of the flocculated material, which flocculated material is constituted essentially of apatite, the latter then being recovered directly, the separation being carried out to recover flocculated material having a particle size equal to or greater than a cut-off size comprised between 30 and 100 μm.

2. Process according to claim 1, wherein said conditioning agent is constituted by sodium silicate.

3. Process according to claim 2, wherein sodium silicate is used having a ratio $SiO_2/Na_2O$ of about 3.5, such a silicate having in aqueous solution a density in the vicinity of 1.33.

4. Process according to claim 1, wherein the duration of said first step (a) is of the order of 0.5 to 3 minutes.

5. Process according to claim 1, wherein in said first step (a), a stirrer is used with a mechanical dispersing effect, capable of well individualizing the particles.

6. Process according to claim 1, wherein in said first step (a), the concentration of solid material is in the order of 150 to 250 g/liter.

7. Process according to claim 1, wherein in the case of treating phosphate ores with a siliceous gangue, the pH is adjusted in the course of the first step (a) to values comprised between 6 and 10.

8. Process according to claim 7, wherein said pH is adjusted to about 9, by the addition of a basic agent constituted by sodium hydroxide.

9. Process according to claim 1, wherein before operating the flocculation provided in the second step (b), the pulp derived from the first step (a) is diluted with water to bring it to a concentration of the order of 50 to 100 g/liter.

10. Process according to claim 1, wherein as a flocculation agent, there is used cellulose or a modified starch, such as carboxymethyl modified cellulose or carboxymethyl starch.

11. Process according to claim 1, wherein the dose of the flocculation agent to be added in the course of the second step (b) is of the order of 0.1 to 8 kg/ton, of pulp, the calculation being with respect to the dry matter content of the latter.

12. Process according to claim 11, wherein said dose of flocculation agent is from 0.1 to 5 kg/t of pulp.

13. Process according to claim 1, wherein in the course of the second step (b), moderate conditions of stirring are used.

14. Process according to claim 1, wherein the duration of the flocculation treatment in the second step (b) is in the order of 1 minute.

15. The process according to claim 1, wherein for the separation in accordance with the third step (c), two successive operations of decantation-sedimentation are carried out, by operating in the course of the first operation with an initial concentration of the order of 50 g/liter and by separating by decantation the particles of flocculated material of granulometry higher than 40 μm from those of granulometry less than 40 μm, which latter particles are discarded, and by operating in the course of the second operation with the fraction of particles of flocculated material of granulometry higher than 40 μm diluted to a concentration of about 25 g/liter and by separating the final phosphate concentrate constituted by the particles of flocculated material of granulometry higher than 40 μm from the ones of granulometry less than 40 μm.

16. Process according to claim 15, wherein the product emerging from the first decantation is rewashed and diluted to a concentration of the order of 25 g/liter, following which a second sedimentation operation is carried out which provides the final concentrate.

17. A selective flocculation process for the treatment of fine fractions of phosphate ore comprised of apatite and a mixture of silicate minerals, the fine fractions being comprised of particles having a particle size less than about 40 μm, comprising the steps of:

(a) conditioning the ore by contacting under agitation the particles of the ore pulp with a conditioning agent comprising sodium silicate, the concentration of solid material in the pulp being from about 150 to 250 g/liters, to form a dispersion;

(b) diluting the pulp from step (a) with water to a concentration of solid material from about 50 to 100 g/liter and adding thereto under agitation a flocculation agent comprised of water-soluble anionic polymer capable of being fixed on the apatite particles, said flocculation agent being selected from the group consisting of derivatives of cellulose, starches, and polysaccharides containing carboxyl groups, to selectively form apatite agglomerates; and (c) subjecting the mixture from step (b) to decantation and sedimentation to recover apatite agglomerates having a particle size equal to or greater than a cut-off size comprised between 30 and 100 μm.

18. Process according to claim 17, wherein the pH of the pulp in step (a) is from 6 to 10.

19. Process according to claim 17, wherein the sodium silicate used in step (a) has a $SiO_2/Na_2O$ ratio of about 3.5.

20. Process according to claim 17, wherein the conditioning agent is present in an amount of from 7.5 to 15 kg per ton of ore.

21. Process according to claim 17, wherein in step (a) the ore particles are contacted with conditioning agent for from 30 seconds to 3 minutes.

22. Process according to claim 17, wherein the pH of the pulp in step (b) is from 6 to 10.

23. Process according to claim 17, wherein the flocculation agent is carboxymethyl modified cellulose or carboxymethyl starch.

24. Process according to claim 17, wherein the flocculation agent is present in an amount of from 0.1 to 8 kg per ton of ore in the pulp.

25. Process according to claim 17, wherein the duration of the flocculation treatment in step (b) is about 1 minute.

* * * * *

UNITED STATES PATENT AND TRADEMARK OFFICE
CERTIFICATE OF CORRECTION

PATENT NO. : 4,235,709
DATED : November 25, 1980
INVENTOR(S) : GERARD BAUDET et al.

It is certified that error appears in the above—identified patent and that said Letters Patent is hereby corrected as shown below:

| Column | Line(s) | |
|---|---|---|
| 1 | 16 | "the phosphate" should read -- that phosphate --. |
| 2 | 13 | "it" should read -- It --. |
| 4 | 58-59 | "Example 1" should appear centered between lines 58 and 59. |
| 9 | 2 | "watersoluble" should read -- water-soluble --. |

Signed and Sealed this

Thirteenth Day of October 1981

[SEAL]

Attest:

GERALD J. MOSSINGHOFF

Attesting Officer         Commissioner of Patents and Trademarks